United States Patent [19]

Bertrand et al.

[11] Patent Number: 5,008,543
[45] Date of Patent: Apr. 16, 1991

[54] SYSTEM FOR DETERMINING THE POSITION OF AT LEAST ONE TARGET BY TRIANGULATION

[75] Inventors: Michel P. Bertrand, Fontenay-Sous-Bois; Michel B. Bucher, Paris; André R. Delclaux, Champigny sur Marne, all of France

[73] Assignee: Sat(Societe Anonyme De Telecommunications, France

[21] Appl. No.: 466,501

[22] Filed: Jan. 17, 1990

[30] Foreign Application Priority Data

Jan. 18, 1989 [FR] France .................. 89 00531

[51] Int. Cl.⁵ .................. G01C 3/08; G01C 3/20
[52] U.S. Cl. .................. 250/342; 356/1; 342/126
[58] Field of Search .............. 356/1, 4, 11; 244/3.16; 250/342; 342/126

[56] References Cited

U.S. PATENT DOCUMENTS

| | | | |
|---|---|---|---|
| 2,489,222 | 11/1949 | Herbold | 356/1 |
| 3,706,493 | 12/1972 | Redmann | 356/4 |
| 3,961,851 | 6/1976 | Gerharz | 356/1 |
| 4,697,081 | 9/1987 | Baker | 250/338.3 |
| 4,704,533 | 11/1987 | Rose et al. | 250/342 |
| 4,745,284 | 5/1988 | Masuda et al. | 250/338.3 |
| 4,806,936 | 2/1989 | Williams | 342/126 |
| 4,847,485 | 7/1989 | Koelsch | 250/221 |

FOREIGN PATENT DOCUMENTS 57-69205 4/1982 Japan .
2070877 9/1981 United Kingdom .

*Primary Examiner*—Constantine Hannaher
*Assistant Examiner*—Jacob M. Eisenberg
*Attorney, Agent, or Firm*—Jacobs & Jacobs

[57] ABSTRACT

A system is disclosed for determining the position of at least one target by triangulation, comprising two passive sighting devices which measure the intensity of radiation received along a sighting line which scans a vertical sighting plane. They are disposed at a distance from each other along the same vertical axis and are driven in rotation about this common axis so that their sighting planes merge. A circuit extracts the angular coordinates of the target, relative to each of the sighting devices, and computes the distance of the target by triangulation in the vertical sighting plane.

10 Claims, 6 Drawing Sheets

SYSTEM FOR DETERMINING THE POSITION OF AT LEAST ONE TARGET BY TRIANGULATION

BACKGROUND OF THE INVENTION

1. Field of the Invention

The present invention relates to a system for determining the position of at least one target emitting radiation, comprising:

two passive sighting devices, sensitive to said radiation, disposed at a distance from each other and movable in rotation about a substantially vertical common axis, means for measuring the intensity of the radiation received by each of the sighting devices along a sighting line scanning a substantially vertical sighting plane, common to the two sighting devices, means for extracting, in response to the intensities measured, the values of the elevation angles of said target relative to the two sighting devices, and means for computing, in response to the values of the elevation angles, the distance of said target by triangulation in said substantially vertical common sighting plane.

Such a system is used on the ground or on board a ship, for example, for monitoring and, as required, designating to a weapons system the targets which menace the site where said system is set up or the ship on board which it is embarked.

2. Description of the Prior Art

A system of the above defined type is already known, described in the British patent application No. 2 070 877. In this system, the two sighting devices are mechanically coupled and mounted on the same turret which is rotatable about a vertical axis. A single device is provided for measuring the intensity of the radiation received, which serves for each of the sighting devices, as well as a single device for rotating the turret.

This system has the drawback of limited accuracy in determining the distance of the target, because the distance between the two sighting devices is also limited, both for mechanical and optical reasons. It is in fact well known that the accuracy of a triangulation system is related to the value of the distance of its base, here the distance between the two sighting devices.

Now, in the known system, it is not possible to increase this distance, for the hollow mechanical structure which supports the upper sighting device becomes too high and too heavy and difficult to drive. In addition, because the optical path of the ray which penetrates through the lower sighting device must be of the same length as the optical path of the ray which penetrates through the upper sighting device, problems arise if the distance between the two sighting devices is too great.

Furthermore, and still for mechanical reasons, it is not possible, in sighting devices, to use lenses having too large a diameter which increase the weight of the rotary mechanical assembly and introduce an imbalance, at least in the case of the upper sighting device.

In addition, the known system involves the use of a semi-reflecting mirror which introduces a measured energy loss, thus reducing the sensitivity correspondingly. Moreover, in the known system, the height of the field common to each of the sighting devices is smaller than that of the field of each of these devices.

Finally, with this known system it is not possible to determine the distances of several sources present at the same time in the sighting plane.

SUMMARY OF THE INVENTION

The present invention aims at overcoming the above drawbacks.

For this, it has as object a system of the above defined type, wherein:

each of the two sighting devices comprises its own means for measuring the intensity of the radiation received, its own drive means for driving it in rotation about said common axis and its own means for measuring its bearing angle, and means are provided for controlling said means driving in rotation about said common axis, in response to the values of the bearing angles measured, and arranged so that said bearing angles are equal.

With the system of the invention, there is neither optical coupling nor mechanical coupling between the two sighting devices. There is no optical coupling because each sighting device comprises its own means for measuring the intensity of the radiation received and no mechanical coupling because each device is mechanically independent of the other and is driven by its own drive means. This is tantamount to saying that, in the system of the invention, the sighting devices form distinct entities which receive and deliver data solely in electric form. The consequence of that is in particular the fact that they can be disposed at a great distance from each other so as to increase the accuracy of the system. In addition, since the sighting devices are mechanically independent, it is possible, all other things being equal, to use lenses of a greater weight, and so a greater diameter, for greater accuracy.

It should be noted that, because the two sighting devices are disposed on the same vertical axis, the dead angles of the system extend about this vertical axis. This is not troublesome in practice for the menacing sources always begin by appearing relatively low on the horizon, before appearing vertically above the system, which moreover rarely occurs. Thus, the targets are always detected before reaching the upper dead angle. In the system of the invention, the only dead angle is the one which is due to the presence of the support of the upper measuring device, in the field of the lower device. This dead angle is however relatively small considering the usual dimensions of the support.

The system of the invention uses two passive panoramic watching devices, for example sensitive to the infrared radiation of the source. Each of the systems could be used alone for determining the bearing angle and elevation angle of each source. The combination of the two devices of the invention makes it possible to compute the distance of each source, which in particular eliminates a large number of parasite signals and makes it possible to distinguish, among the sources whose bearing and elevation angles vary little from one revolution to another, the approaching sources which are the most menacing. Moreover, with such devices which make it possible to measure the coordinates of a target for a succession of evenly spaced measurement times, it is useful to carry out predictive filtering of the values measured at the preceding times, so as to anticipate the most probable values of the coordinates at the next measurement time, taking into account the previously measured values and the general laws which govern the movement of the targets. When the distance of the target is known, such filtering on the previous revolutions can only be made for the two bearing and elevation coordinates of the target. With the system of the invention, in addition to its bearing and elevation, the distance of the target is known. Thus, three dimensional predictive filtering can be carried out, which is much more reliable than two dimensional filtering.

The system of the invention in fact provides all the advantages of a conventional radar, since it makes in particular panoramic watching possible about the installation to be protected, and determination of the distance of the menacing targets. However, the system of the invention does not suffer from one of the most serious drawbacks of such a radar since it is totally discreet because it is passive. Moreover, on board a ship, the system of the invention is much less sensitive to the presence of waves than a conventional radar.

Advantageously means are provided for determining, in response to the values at the output of said extraction means of the bearing angle and of the elevation angle relative to one of the sighting devices, first ranges of possible values for the bearing angle and the elevation angle relative to the other sighting device and first means for comparing, with the first ranges of possible values, the values at the output of said extraction means of the bearing angle and of the elevation angle relative to the other sighting device and inhibiting said means computing the distance of said target when these values at the output of said extraction means are not included in the first ranges of possible values.

In this case, the system is capable of determining the distance of each of the targets of a plurality of targets present at the same time in the zone which it analyzes without the danger of mistaking one target for another and thus making a false calculation of the distance of a target, from the value of the elevation angle at which this target is seen from one of the sighting devices, and from the elevation angle at which a different target is seen from the other sighting device. Moreover, a certain number of parasite alarms, due for example to noises which might give rise to detection by one only of the sighting devices are thus eliminated.

Again advantageously, said extraction means also determine the values of the intensities received by each of the sighting devices from said target, said means for determining the first ranges of possible values also determine, in response to the value at the output of said extraction means of the intensity received by one of the sighting devices, a first range of possible values for the intensity received by the other sighting device and the first comparison means also compare the value at the output of said extraction means of the intensity received by the other sighting device with the first corresponding range of possible values.

This latter characteristic reinforces the safety provided by the above mentioned characteristic because the intensity received from the source is used as criterion for recognizing the radiation received from the same source.

Again advantageously, each of said sighting devices comprises a mosaic of elementary detectors, said measured intensities are those of pixels of an image of the zone analyzed by each of the sighting devices, and said extraction means comprise means for determining the coordinates of the image pixel of the target and means for determining the angular coordinates of the target by extrapolation.

In this case, the maximum distance at which the distance of the target may be determined, related to the accuracy of measurement of the elevation angles, is increased because extrapolation eliminates, at least partially, the effects of quantification in the measurement of these angles, which is related to the use of a mosaic of elementary detectors.

Again advantageously, said means for determining the angular coordinates of the target by extrapolation also determine by extrapolation the intensity received from the target.

The accuracy of determining the intensities received is increased, which reduces the risk of confusion between two different targets.

Again advantageously, said means for calculating the distance of said target comprise means for calculating the tangents of said elevation angles, means for calculating the difference of said tangents, means for predictive filtering of said difference over several revolutions of rotation about said common axis, and means for calculating the distance of said target in response to said tangents and said filtered difference.

The predictive filtering carried out on the value of the difference of the tangents is easier and more accurate than that which might be made on the distance.

Again advantageously, tracking means are provided for determining, in response to the angular coordinates of the target determined during a revolution of rank n, second ranges of possible values for the angular coordinates of the target during the revolution of rank (n+1), and second means for comparing, with the second ranges of possible values, the values determined during the revolution of rank (n+1) and reducing, in response to the distance measured during the revolution of rank n, said first range of possible elevation angle values, when the values determined during the revolution of rank (n+1) are included in said second ranges of possible values.

The system is then capable of following, over several revolutions, the evolution of each of the targets of a plurality of targets spread out over the zone analyzed.

BRIEF DESCRIPTION OF THE DRAWINGS

The present invention will be better understood from the following description of a preferred embodiment of the system of the invention, with reference to the accompanying drawings in which.

DESCRIPTION OF THE PREFERRED EMBODIMENTS

Figure 1:
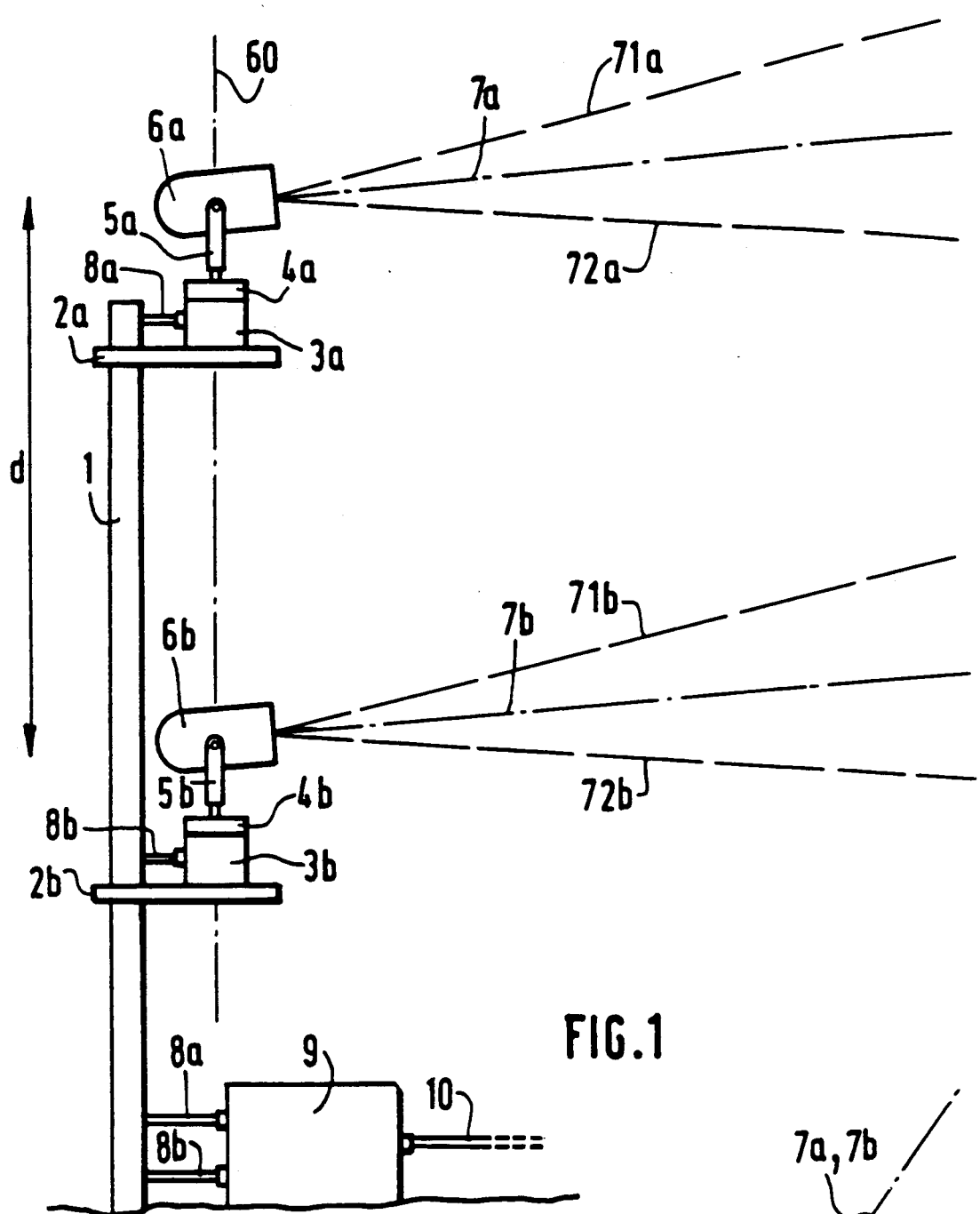
FIG. 1 is a side view of the system of the invention.

FIG. 1 shows a system in accordance with that of the invention, set up on the ground, in the vicinity of a site to be protected and intended to watch the surrounding space for detecting possible menacing targets and determining their positions for destroying them by means of a weapons system.

The system comprises two rotary sighting devices, in this case two infrared passive panoramic watching devices, identical with each other and designated by the references 6a and 6b.

Device 6a is supported by a stirrup piece 5a, which is driven in rotation about a vertical axis 60 by motor 3a. This rotational movement is referenced R in FIG. 2. Device 6a comprises, in a way not shown for it is known, a mosaic, here in the form of a strip, of elementary infrared detectors, disposed vertically in the focal plane of an infrared optical system, not shown for it is known. Each elementary detector of the strip measures then the intensity of the infrared radiation received by the device 6a in a direction associated with this elementary detector. The output signal of each elementary detector is processed in an elementary chain which is associated therewith and which comprises a preamplifier, an amplifier and a filter. A multiplexer connects the output of each of the elementary chains successively and sequentially to a common output. The result is that the device 6a measures the intensity of the infrared radiation which it receives along a sighting line scanning a vertical sighting plane. This sighting plane contains the axis 60. In FIG. 1, the sighting line is referenced 7a and it is shown in its median position, about which it may move to two endmost positions referenced 71a and 72a. The speed of scanning the sighting plane by the sighting line and the speed of rotation R are adjusted with respect to each other so that the signal at the output of the multiplexer is a video signal representing a sufficiently accurate infrared image of the zone analyzed, which zone is included between the cones having axis 60 described by the endmost positions 71a, and 72a during rotation R.

Similarly, device 6b is supported by a stirrup piece 5b which is driven in rotation about the same vertical axis 60 as device 6a, by a motor 3b. Like device 6a, device 6b is adapted so that its sighting line 7b scans a vertical sighting plane containing the common axis 60, between two endmost positions reference 71b and 72b it delivers a video signal representing an infrared image of the zone which it analyzes, which zone is between the cones of axis 60 described by the endmost positions 71b and 72b during the rotation R. The mean position of the sighting line 7b is parallel to the mean position of the sighting line 7a.

An angular sensor 4a measures the bearing angle of the sighting plane of the device 6a, namely the angle between this sighting plane and a vertical reference plane containing the common axis 60. Here, with the system immobile with respect to the ground, it is obviously possible to choose the reference plane so that the bearing angle is identical to the azimuth angle. Similarly, an angular sensor 4b measures the bearing angle of the sighting plane of device 6a.

Motor 3a and motor 3b are disposed on horizontal platforms 2a and 2b. The platforms 2a and 2b are mounted on a vertical mast 1 so that devices 6a and 6b are disposed at a distance from each other, the distance which separates them being here referenced d.

An electric cable 8a connects motor 3a, device 6a and sensor 4a to an objective control and designation circuit 9. Similarly, an electric cable 8b connects motor 3b, device 6b and sensor 4b to circuit 9. A data transmission bus 10 connects circuit 9 to a tactical exploitation system not shown and intended for controlling the weapons system.

In response to the signals output by the angular sensors 4a and 4b and by the sighting devices 6a and 6b, circuit 9 controls motors 3a and 3b, determines the three coordinates of the infrared radiation source(s) which might be menacing targets and transmits these coordinates to the tactical exploitation system thus designating to the latter the objectives to be reached.

Figure 3:
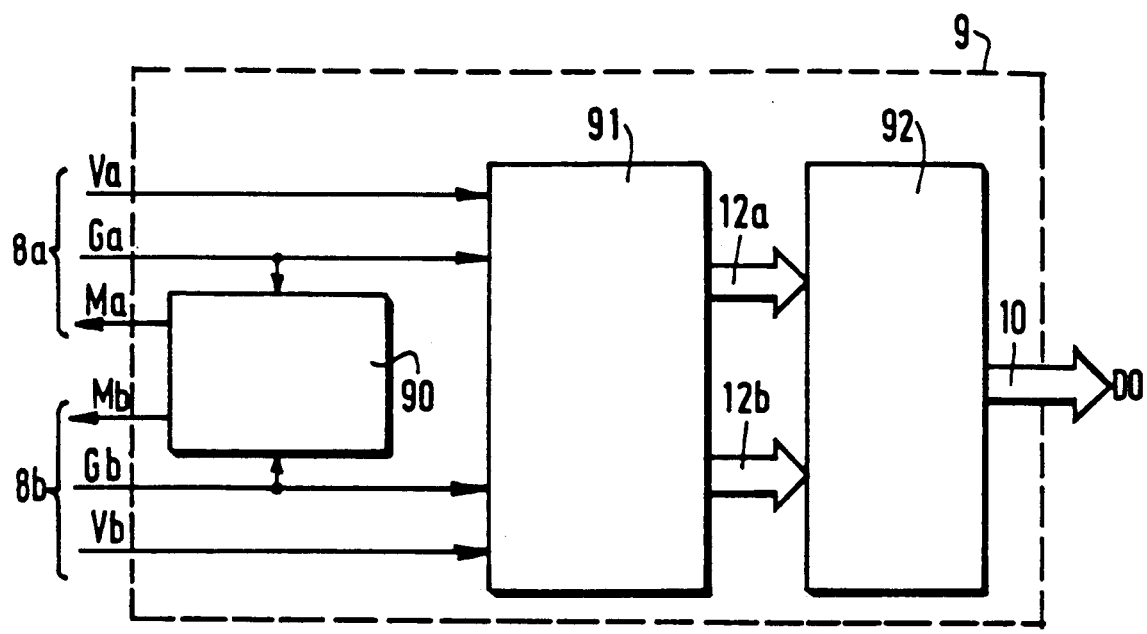
FIG. 3 is a block diagram of the electronic objective control and designation circuit of the system of FIG. 1.

The objective control and designation circuit 9 will now be described in greater detail with reference to FIG. 3.

A circuit 90 for controlling the motors is provided with two inputs which receive the output signals from sensors 4a and 4b respectively, which signals are referenced Ga and Gb respectively, and which represent the measured values of the bearing angles of the sighting planes of the devices 6a and 6b, respectively.

An alarm extraction circuit 91 is provided with two inputs which receive the signals Ga and Gb, respectively, and two inputs which receive the video signals output by devices 6a and 6b, respectively, which signals are referenced Va and Vb, respectively. Circuit 91 is also provided with two digital output buses 12a and 12b. Bus 12a transmits respectively the dated bearing, the dated elevation and the dated amplitude of each alarm, i.e. of each source of relatively considerable infrared radiation present in the zone analyzed by the sighting device 6a during each of its revolutions about axis 60. Bus 12b transmits the same dated magnitudes for each alarm in the zone analyzed by the sighting device 6b during each of its revolutions. By dated magnitude is meant here the value of this magnitude at a given time, accompanied by the value of this given time.

A circuit 92 for determining the targets and calculating their distance comprises two inputs connected to buses 12a and 12b, respectively, and an output connected to the digital bus 10 which delivers an objective designation signal, referenced DO. The objective designation signal DO represents, for each target or objective, the values of its bearing or its azimuth, of its elevation, of its distance, the values of the drifts, with respect to time of these three magnitudes, the value of the intensity of the infrared radiation received from this target and the time at which these values were determined. It therefore comprises information concerning the credibility of the targets, considered as menacing, so that the tactical exploitation system can make decisions.

Before the more detailed description of each of circuits 90, 91 and 92, the overall operation of the system which has just been described will be discussed.

Figure 2:
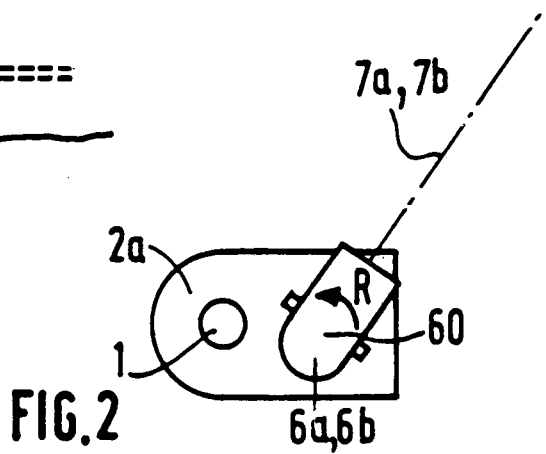
FIG. 2 shows a top view of the system of the invention.

Circuit 90 for controlling the motors is adapted so that the sighting planes of devices 6a and 6b are permanently merged, as shown in FIG. 2. Thus, any infrared radiation source is present simultaneously in the common sighting plane of the two devices 6a and 6b.

If this source is relatively intense, and if it is in the zone common to the two zones analyzed by devices 6a and 6b respectively, the alarm extraction circuit 91 then delivers, over each of buses 12a and 12b, the bearing angle, the elevation angle and the intensity, all dated, of this alarm.

It is important here to note that, if the relatively intense source of which it is a question is a menacing target, it has every chance of being present in the zone common to the two zones analyzed. In fact, a menacing target may be detected by a device such as device 6a at a distance which is generally very great compared with the distance between device 6a and device 6b. At this distance, the two zones analyzed by each of the two sighting devices 6a and 6b are in practice merged.

The two bearing or azimuth angles determined by devices 6a and 6b and relative to the same alarm are in principle identical, since the two sighting planes of devices 6a and 6b are merged.

Figure 4:
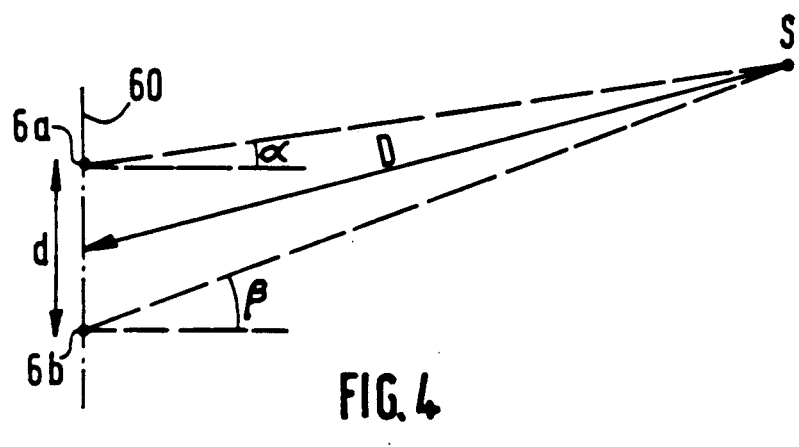
FIG. 4 shows in a simplified way the relative arrangement of a target and of the system of FIG. 1.

On the other hand, and as is clear from FIG. 4, the two elevation angles determined by devices 6a and 6b for the same alarm, or source S, are not identical. FIG. 4 shows the relative positions of such a source S and of the devices 6a and 6b considered as pinpoint, the distance d being exaggeratedly expanded for the clarity of the drawings. The distance from source S to the middle of the segment which joins devices 6a and 6b is referenced D. It will be noted that the elevation angle $\alpha$ at which source S is seen from device 6a, which angle is that which the ray going from source S towards device 6a forms with the horizontal plane passing through device 6a, is different from the elevation angle $\beta$ at which source S is seen from device 6b. Here, since device 6a is disposed above device 6b, the following relation is always verified:

$$\alpha < \beta \tag{1}$$

The two intensities of the infrared radiation relative to the same alarm, which are measured by devices 6a and 6b, are practically identical. In fact, since the measurements are made simultaneously, the only causes which may be at the origin of a difference are a difference in the intensity of the radiation emitted by source S and a difference in the attenuation of this radiation along its path towards the corresponding sighting device. Now, considering the relative values of distances d and D, the two radiation emission angles and the two paths are extremely closely related, as shown in FIG. 4 in which, as has already been mentioned, distance d has been exaggeratedly expanded. In addition, the variations of the radiation pattern of the source and of the causes of attenuation along the paths are relatively smooth. The result is that the two intensities measured by devices 6a and 6b remain very close to each other.

The circuit 92 uses the above criteria on the values of the bearing angles, the elevation angles and the intensities transmitted over buses 12a and 12b for determining whether these values are in fact relative to the same source, and calculating, in this case, the distance D of this source by triangulation in the common sighting plane, by means of the trigonometric formula derived from FIG. 4:

$$D = d\sqrt{1 = 0.25 \, (\tan\alpha + \tan\beta)^2 / (\tan\beta - \tan\alpha)} \tag{2}$$

Circuit 92 thus determines the distance of the alarm sources and, for example, by following their evolution during successive revolutions, determines whether it is in fact a question of targets to be attacked.

The motor control circuit 90 comprises a circuit for controlling the motor 3a which delivers the appropriate signal Ma so that motor 3a effects a regular rotation at a suitable speed. It also comprises a slaving circuit delivering to motor 3b the signal Mb, such that signal Gb remains permanently equal to signal Ga. Circuit 90 is therefore within the scope of a man skilled in the art and will not be described further.

Figure 5:
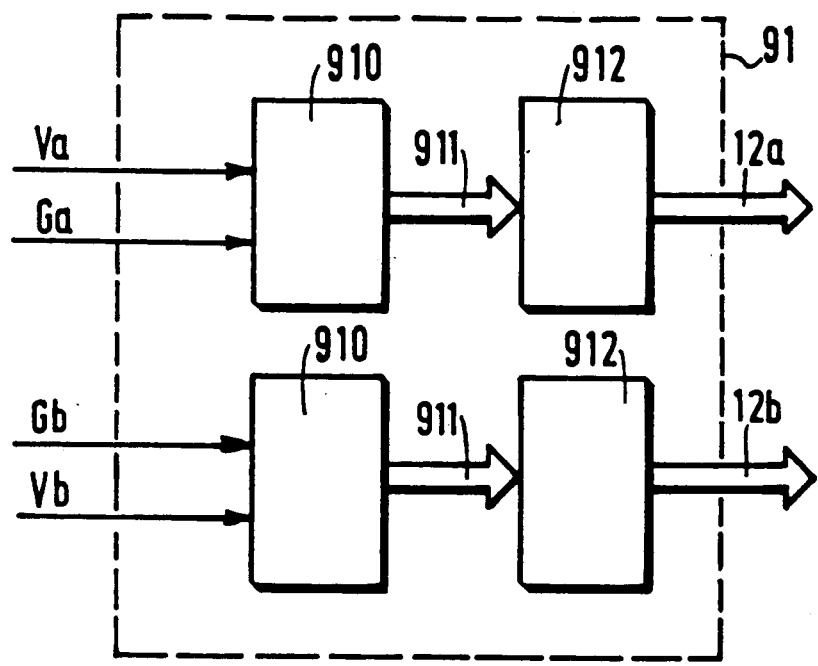
FIG. 5 is a block diagram of the alarm extraction circuit of the circuit of FIG. 3.
Figure 6:
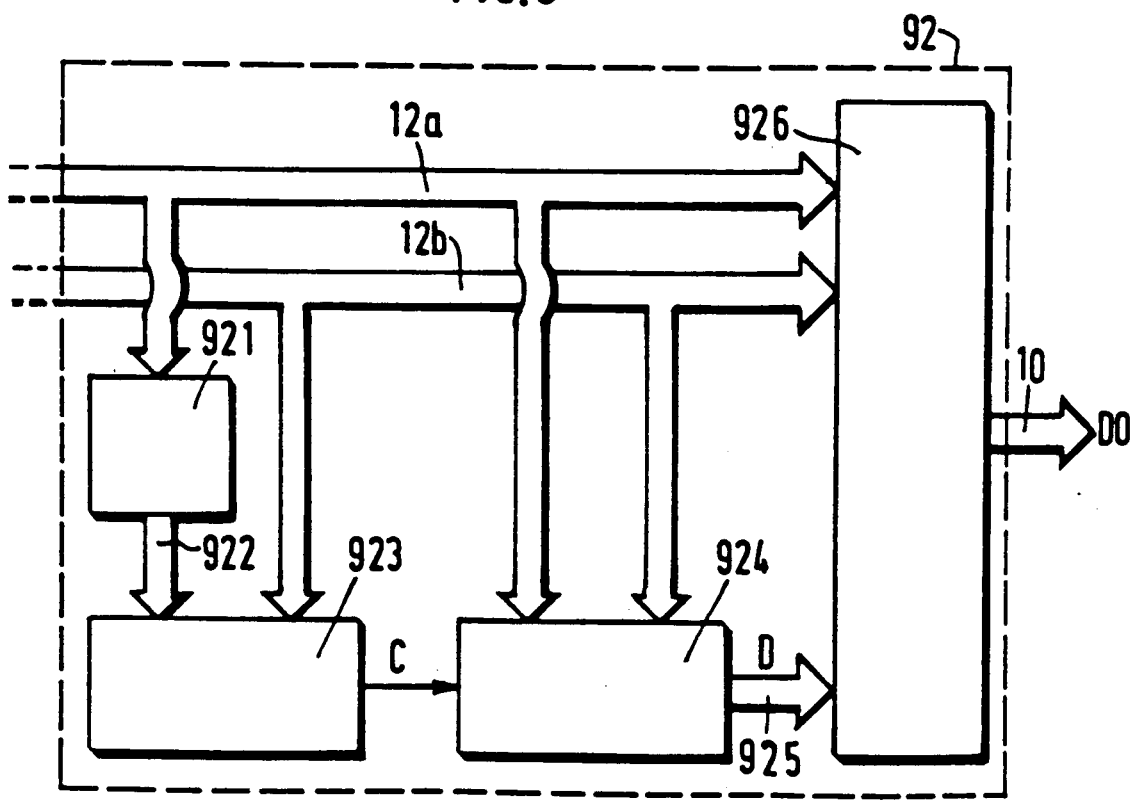
FIG. 6 is a block diagram of the circuit determining the targets and calculating their distance of the circuit of FIG. 3.

The alarm extraction circuit 91 comprises here, and with reference to FIG. 5, two identical chains, one for processing the signals Va and Ga relative to device 6a and the other for processing the signals Vb and Gb relative to device 6b.

Each of these chains comprises a circuit 910 for determining the coordinates and intensity of the image pixels of the alarms and a circuit 912 for determining the angular coordinates and the intensity of each of these alarms.

Circuit 910 of the chain relative to the device 6a is provided with two inputs which receive the video signal Va and signal Ga, respectively, and it is connected to circuit 912 by a digital bus 911. Here, the signals Va and Ga are transformed into a succession of digital samples each representative of a pixel of the infrared image of the zone analyzed by device 6a.

More precisely, each digital sample represents the dated angular coordinates and intensity of each pixel.

The angular coordinates are the bearing angle, which is that of the sighting plane of the device 6a at the time of measurement of the intensity of the pixel, and the elevation angle, related to the rank, in the strip of elementary detectors, of the elementary detector corresponding to the pixel.

In a way known per se, each of these samples is "apodized", that is to say that from the value of its intensity is subtracted the mean value of the intensity of the samples relative to the pixels of a zone of appropriate size centered on the pixel in question. Such "apodization" produces effects similar to that which high pass filtering of the video signal would produce.

A value of a self-matching threshold is then calculated for each sample, which is equal to the mean value of the absolute value of the apodized intensity of the samples relative to the pixels of a zone of appropriate size centered on the pixel in question.

If the absolute value of the apodized intensity of a pixel is greater than the value of the self-matching threshold calculated for this pixel, multiplied by a multiplicative coefficient M determined as will be explained further on, and if the non apodized intensity of this pixel is greater than the non apodized intensity of all its neighbors, the pixel is considered as being the image of an alarm, namely one of the most significant infrared radiation sources of the zone analyzed by device 6a.

The multiplicative coefficient M is determined so that the alarms are only taken into account in a reasonable number. In fact, it is clear that if M is small, a large number of alarms will be taken into account, among which there will inevitably be false alarms, such for example as the noises of detectors or landscape parasites. If, on the other hand, M is high, there will only be a few alarms taken into account but then true menacing targets risk being neglected.

The number of alarms per revolution is counted. The value of the multiplicative coefficient M remains the same for a revolution of given rank, but it is updated at each revolution as a function of the number of alarms counted during the preceding revolution. Thus, the value of coefficient M at each revolution is adjusted so that the total number of alarms per revolution remains reasonable.

The dated coordinates and intensity of each image pixel of an alarm, as well as those of the pixels adjacent this latter are transmitted, over bus 911, to circuit 912.

Circuit 910 whose detailed operation has just been described comprises essentially A/D conversion, digital sample storage and computing circuits. The arrangement of these circuits for carrying out the function described is within the scope of a man skilled in the art.

Circuit 912 determines, by extrapolation, from the dated coordinates and intensity of each image pixel of an alarm and of its neighbors, the exact angular coordinates and the intensity of the corresponding source or alarm.

In fact, it is obvious that the two elevation angles $\alpha$ and $\beta$ must be known with good accuracy so that a certain confidence may be accorded to the result of calculating the distance D from the triangulation formula (2). Now, at the output of circuit 910, the angular coordinates, and particularly the elevation angle of the image pixel are quantified. In particular, the elevation angle is determined by the rank, in the strip of elementary detectors, of the detector relative to this pixel, as has already been mentioned. Such quantification is obviously at the origin of an inaccuracy, which may be tolerated if distance D is not too great with respect to distance d, but which must be eliminated in the other cases. This is the role of circuit 912, in which the exact angular coordinates of the alarm are determined by calculating the barycenter of the centers of the image pixel of the alarm and of its neighbors, to each of which a coefficient is assigned equal to its intensity. Similarly, in order to compare the intensities of the radiation received from the same source by devices 6a and 6b, for example, it is preferable to know this intensity with good accuracy. Now, in some cases, the spot due to the radiation received by device 6a may overflow about the elementary detector on which the image is mainly formed. In this case, the intensity of this image pixel does not represent the whole of the radiation received and may result in an error. To this end, in circuit 912, the intensity of each image pixel of an alarm is increased by the intensities of the neighboring pixels so as to thus reconstitute the whole of the infrared radiation received from the alarm source.

Thus, circuit 912 determines the dated bearing angle, the dated elevation angle and the dated intensity of each alarm, relatively to device 6a and it transmits these values to circuit 92 over bus 12a.

Circuit 912 whose detailed operation has just been described comprises mainly computing circuits which operate on the coordinates of the centers and on the intensities of each alarm image pixel and its neighbors. Its design is within the scope of a man skilled in the art.

Chain 910, 911 and 912 receiving the signals Vb and Gb relative to device 6b transmits the dated bearing angle, the dated elevation angle and the dated intensity of each alarm relatively to device 6b, over bus 12b.

Circuit 92 for determining the targets and calculating their distance will now be described with A window calculating circuit 921 is provided with a digital input connected to bus 12a and a digital output connected to a bus 922. When it receives, over bus 12a, the dated values of the bearing angle, of the elevation angle and of the intensity of an alarm detected by device 6a, circuit 921 determines the frontiers of three ranges of possible values inside which must necessarily and respectively be situated the values of the bearing angle, of the elevation angle and of the intensity of a identically dated alarm, but detected by means of device 6b, when these two alarms are relative to the same source. The range of bearing angles is centered on the value of the bearing angle on bus 12a and its width depends on the accuracy of the measurement of the bearing angles. It is almost the same for the range of intensities, centered on the value of the intensity on bus 12a and whose width depends on the accuracy of the measurement of the intensities, and on the maximum foreseeable amplitude of the variations between the two intensities received, which variations have already been discussed. In so far as the range of elevation angles is concerned, it is not centered on the value $\alpha$ of the elevation angle on bus 12a, considering the relation (1) which indicates that the value $\beta$ of the elevation angle on bus 12b is always greater than the value $\alpha$. The lower frontier of the range of elevation angles is therefore the value $\alpha$ itself, reduced by a small amount taking into account the accuracy of the measurement of the elevation angles. The upper frontier depends on the minimum distance at which it is estimated that the menacing targets may appear in the zone analyzed. In fact, the value $\beta$ is all the higher, relatively to the value $\alpha$, the closer the source to the system. Thus, false alarms due to birds are eliminated which are generally detected at a fairly close distance. It may be considered that the set of three range calculated by circuit 921 form a "three dimensional window" whose dated frontiers are transmitted over bus 922. Circuit 921 is a computing circuit within the scope of a man skilled in the art.

A circuit 923 for comparison with the window is provided with two digital inputs connected respectively to bus 922 and to bus 12b and a binary output delivering a high level signal C if and only if the values of the bearing angle, the elevation angle and of the amplitude on bus 12b, dated identically to the window on bus 922, are included respectively in the three ranges defined thereby. Circuit 923 is obviously within the scope of a man skilled in the art.

Figure 7:
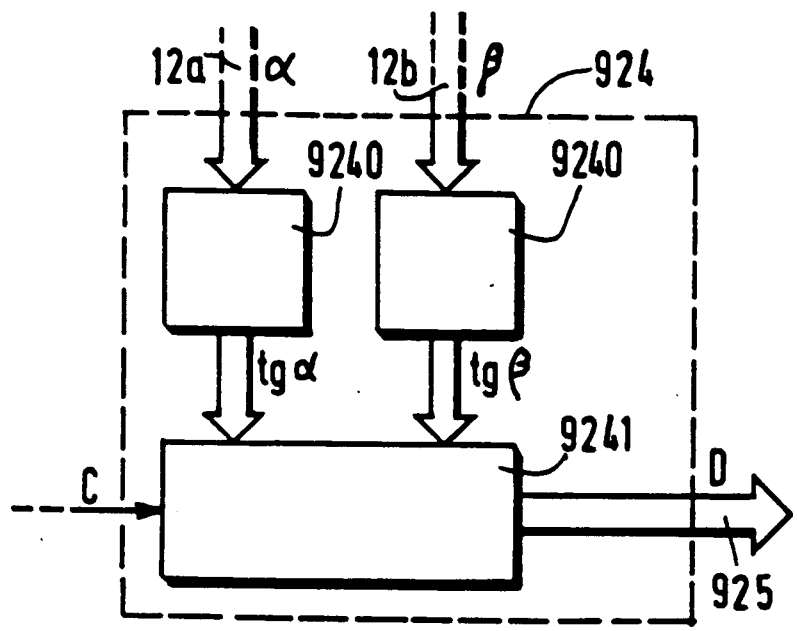
FIG. 7 is a block diagram of a distance computing circuit of the circuit of FIG. 6.

A distance computing circuit 924 is provided with two digital inputs connected respectively to the buses 12a and 12b, a binary input receiving the signal C and a digital output connected to a bus 925. When signal C is at the high level, circuit 924 computes the distance D from the values of the elevation angles $\alpha$ and $\beta$ on buses 12a and 12b, respectively. When signal C is at the low level, circuit 924 is inhibited. The formula of the computation used by circuit 924 is the formula (2) and distance D thus computed is fed on to bus 925. A more detailed diagram of circuit 924 is given in FIG. 7, where two identical circuits 9240 are shown for determining, from the values of $\alpha$ and $\beta$ on buses 12a and 12b, values of tan $\alpha$ and tan $\beta$, and a circuit 9241 for computing the formula (2). Circuit 9241 is inhibited when the signal C is at the low level. These circuits are within the scope of a man skilled in the art.

An objective designation circuit 926 is provided with three digital inputs connected respectively to buses 12a, 12b and 925, and a digital output delivering the objective designation signal DO. The latter may be elaborated as soon as a value of distance D is available on bus 925, this value being fed to the weapons system with bearing, elevation, intensity values and the time of observation of the menacing target determined in response to the data on buses 12a and 12b. However, it is also possible for the objective designation circuit 926 to compare the results obtained over several successive revolutions, so as to make sure that this target appears from one revolution to another, and so as to compute in particular the drifts, with respect to time, of the bearing angle, of the elevation angle and of the distance of the target, so as to feed them also over bus 10 to the tactical exploitation system. Similarly, in a way known per se, it is possible to carry out predictive filtering on the coordinates of the target. Circuit 926 comprises digital sample memorization and computation circuits and its design is within the scope of a man skilled in the art.

Figure 8:
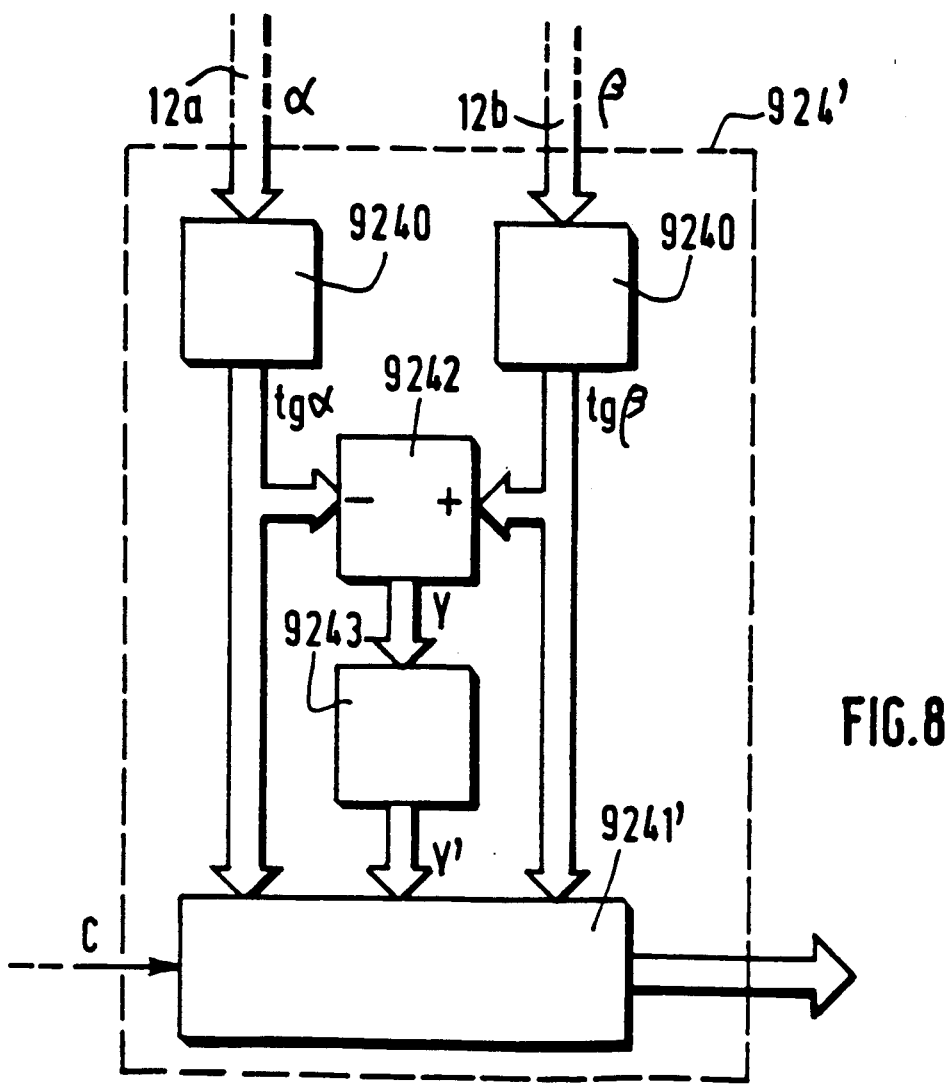
FIG. 8 is a variant of the circuit of FIG. 7.

Referring to FIG. 8, a variant, referenced 924' of the distance computing circuit 924 will now be described.

In circuit 924', we find again the circuits 9240 of circuit 924. However, a digital subtraction circuit 9242 is provided which is connected to the two output buses of circuits 9240 for computing a value Y defined by the relation:

$$Y = \tan\beta - \alpha \qquad (3)$$

A predictive filter 9243 is provided with an input bus receiving the difference Y at the output of subtracter 9242 and an output bus delivering the difference Y after filtering, reference here Y'.

A computing circuit 9241 is provided with three inputs, connected respectively to the two output buses of circuits 9240 and to that of circuit 9243 and computes the distance D from the relation:

$$D = d\sqrt{1 + 0.25(\tan\alpha + \tan\beta)^2/Y'} \qquad (4)$$

Like circuit 9241 of circuit 924, the circuit 9241' is inhibited if signal C is at the low level.

The predictive filter 9243 is adapted, in a way known per se, for memorizing at each revolution the value of Y which results from determining the elevation angles $\alpha$ and $\beta$ of source S and for storing the values of Y memorized during the preceding n revolutions. The n values thus memorized represent the past time evolution of Y, from which circuit 9243 predicts the value of Y for the present revolution. For this, circuit 9243 determines a regression polynomial, for example of the 2nd or 3rd degree depending on the maximum foreseeable acceleration of source S, which reproduces as well as possible the past time evolution of Y and it computes, from this polynomial, the value Y' which is fed to circuit 9241'. Here, the value of Y in the present revolution serves for determining the new regression polynomial from the old polynomial which makes it possible to compute the value of Y', and so on.

The advantages of such predictive filtering are the fact that the past evolution of the source is taken into account, which introduces filtering in the distance determination and reduces the influence which a deviating measurement point might have, in a system without filtering.

In the present case, it would be possible to complete the computing circuit 9241, in circuit 924, by a predictive filtering circuit. However, the solution chosen in circuit 924', where the predictive filtering is only carried out on the quantity Y, has the advantage that, since the error on this quantity is related solely to the accuracy of the measurement of the elevation angles, it is therefore independent of the distance D of the target. If predictive filtering is carried out on distance D of the target, because the error on this distance varies as the square of this distance, the weight accorded to the oldest distance measurements, made when the target Was still far away, would be too great and the filtering accuracy would be reduced. This drawback is overcome by carrying out filtering on quantity Y and computing the true distance from the filtered quantity Y', as has just been explained. In this connection, it should be noted that distance D is in practice reversely proportional to the quantity Y', the term under the radical of formulae (2) and (4) playing a role only for the second order. Naturally, it is still possible to carry out predictive filtering on D, in addition to predictive filtering on Y, if that is thought useful. Circuit 924' comprises memorization and computing circuits which are within the scope of a man skilled in the art.

Figure 9:
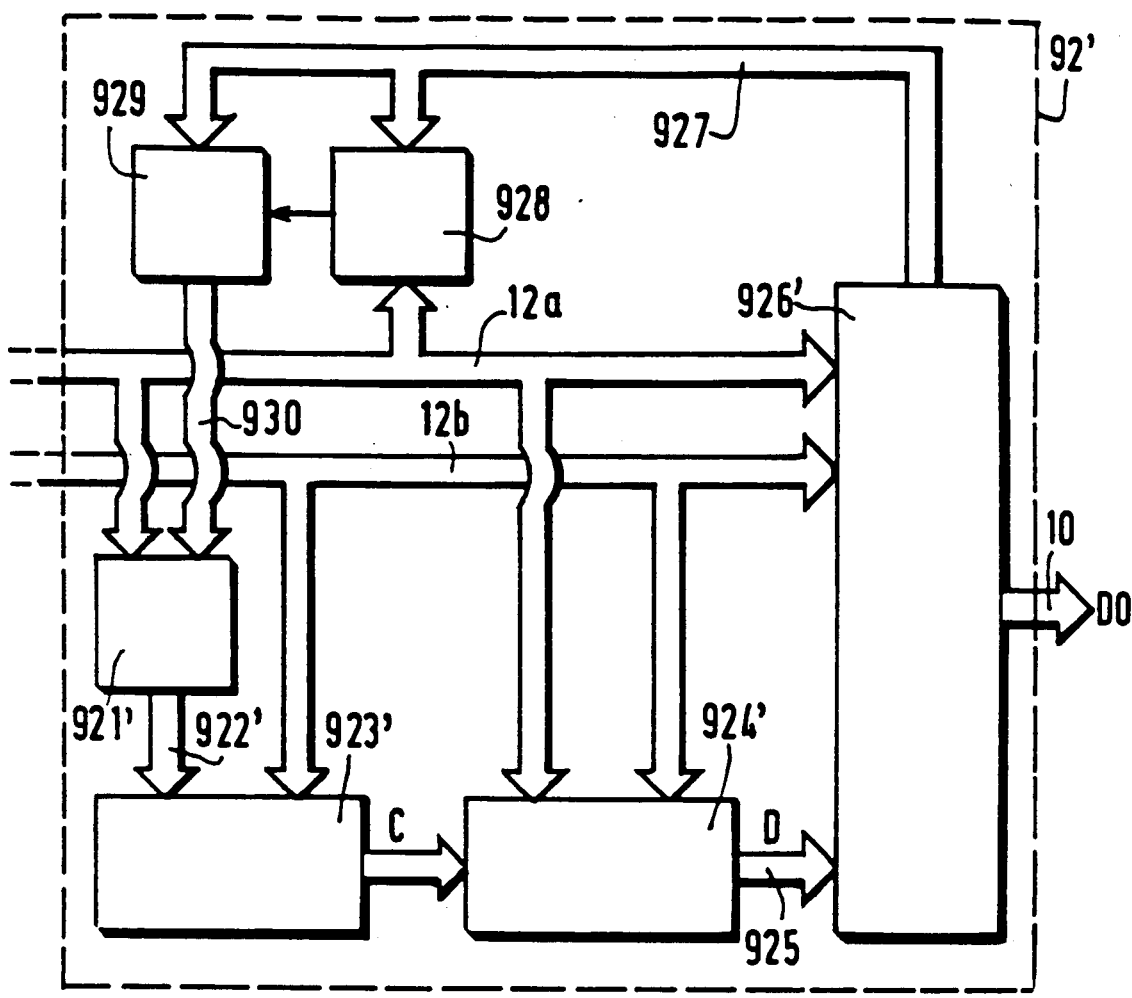
FIG. 9 is a variant of the circuit of FIG. 6.

Referring to FIG. 9, a variant referenced 92' of circuit 92 will now be described.

The essential difference between circuit 92' and circuit 92 resides in the fact that the objective designation circuit 926 is replaced by an objective designation and tracking circuit 926'.

The tracking function performed by circuit 926' has as result the fact that, when a target has been detected and its distance D determined during the revolution of rank n, circuit 926' determines a "prediction or tracking window" to which it assigns a "track number". The tracking window is computed in the same way as the window discussed in connection with circuit 921 but, here, taking into account the possible changes between the revolution of rank n and the revolution of rank (n+1), considering the maximum foreseeable accelerations of the expected targets, of their possible attitude changes, etc. . . . The tracking window is here a "three dimensional" window comprising a range of possible values for the bearing angle, a range of possible values for the elevation angle and a range of possible values for the intensity during the revolution of rank (n+1), which range is determined in response to the values determined during the revolution of rank n.

The data characterizing the tracking window, as well as distance D and the track number are fed, over a bus 927 to a circuit 928 for comparison with the tracking window and to a gate circuit 929.

Circuit 928 for comparison with the tracking window is identical to circuit 923 and it is therefore provided with two inputs receiving respectively bus 927 and bus 12a and a binary output which controls the opening of the gate circuit 929.

The gate circuit 929 is provided with an input connected to bus 927 and an output connected to a bus 930. The gate circuit 929 is in fact a double gate which, when it is open, lets the data from bus 927 pass, which is relative to distance D and to the track number on bus 930.

A window computing circuit 921', comparable to circuit 921, but having a second input which receives bus 930, differs from circuit 921 particularly by the fact that the upper frontier of the range of possible values for the elevation angle $\beta$ on bus 12b is determined no longer so as to correspond to the minimum detection distance, as in circuit 921, but in response to the distance D determined in the preceding revolution. Thus, taking into account the maximum foreseeable accelerations of the target, the width of the range can be limited and the performance of the system in the presence of a very large number of targets improved. Circuit 921' feeds the track number over bus 922' in addition to the data relative to the ranges of the window. Circuits 923' and 924' accomplish the same functions as circuits 923 and 924, respectively, by feeding the track number which is thus restored to the objective designation and tracking circuit 926'.

Then circuit 926' computes a new tracking window, to which it assigns the same track number and the new value of the distance, and which will be used for the following revolution.

During this following revolution, circuit 928 compares the data on bus 12a with the tracking window. If target S is in the expected window, the track number and the new value of the distance are fed to the circuit 921' which determines a window for the data on bus 12b. Circuit 923' checks that the target S is in the expected window and allows the new distance value to be computed, and so on.

Thus, it is clear that circuit 926' truly follows, and as its name indicates, the track of each target, from one revolution to the next. Thus, the system is capable of processing separately each of the targets of a plurality of targets present simultaneously in the analyzed zone.

The system of the invention such as described is installed on a mast 1 fixed to the ground for watching a land site.

This system may however, and advantageously, be installed on a ship for watching the environment about the ship. In this case, mast 1 is the mast of the ship and although it remains substantially vertical, it is nevertheless subjected to the movements of the ship and it is necessary to compensate the measurement of the angles so as to take into account the influence of such movements.

The first precaution to take consists in computing the azimuth angles from the bearing angles and from the position of the boat.

Figure 10:
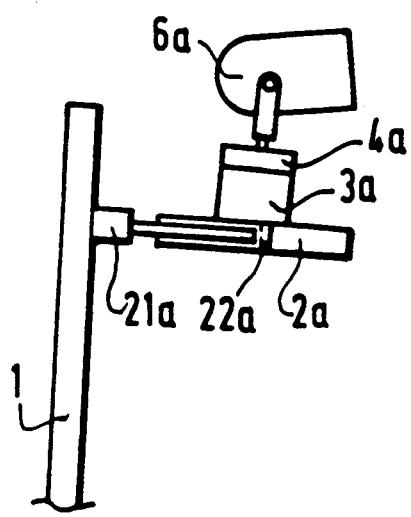
FIG. 10 is a partial view of a variant of the system of FIG. 1.

In addition, in a ship, platforms 2a and 2b are no longer fixed to mast 1 but are hinged thereto as is shown schematically in FIG. 10, relative to platform 2a. A known type of stabilization system is provided for each platform which is disposed for example in cases 21a and 22a of FIG. 10 for holding it in a horizontal position whatever the orientation of mast 1. Such a system is however not perfect and it cannot be assumed that each platform is strictly horizontal at all times. Therefore, the two angles between each platform and mast 1 are permanently measured and in two perpendicular planes, using angular sensors disposed in cases 21a and 22a. This makes it possible to determine angle $\alpha_p$ between the plane of the platform and mast 1.

Similarly, the vertical unit of the ship permanently determines the angle $\alpha_m$ between the mast and a strictly horizontal plane.

Figure 11:
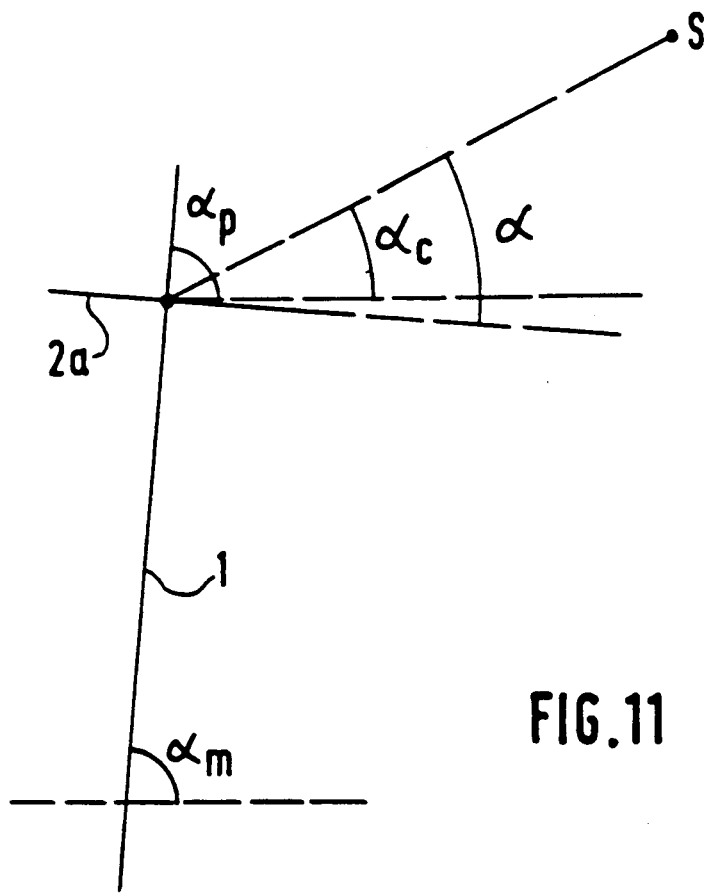
FIG. 11 shows schematically the mast and one of the platforms of the system of FIG. 10 in the presence of a target.

FIG. 11 shows schematically these different angles in the simplified situation in which angles $\alpha_p$ and $\alpha_m$ are in the same plane, in this case that of the figure.

In FIG. 11, the elevation angle at which device 6a sees source S is referenced $\alpha$ and this is the angle between the ray coming from source S and platform 2a which supports the sighting device 6a.

Examination of FIG. 11 shows that the corrected elevation angle $\alpha_c$ of source S to be taken into account is related to angles $\alpha, \alpha_p$ and $\alpha_m$ by the relation:

$$\alpha_c = \alpha + \alpha_m - \alpha_p \quad (5)$$

It is within the scope of a man skilled in the art to provide, downstream of each circuit 912 of FIG. 5, for example, a circuit which, in response to the values $\alpha_p$ and $\alpha_m$ determined as indicated, corrects angle $\alpha$ or as required $\beta$, determined by circuit 912 for delivering the corrected value $\alpha_c$ in accordance with formula (5). Naturally, when angle $\alpha_m$ between mast 1 and the horizontal plane is different from 90°, the distance D of formulae (2) and (4) must be corrected into the distance d' according to the formula:

$$d' = d \sin \alpha_m \quad (6)$$

In fact, the distance between devices 6a and 6b to be taken into account for triangulation computation in circuits 9241 and 9241' is that of the projection, along a vertical axis, of a segment which joins the devices 6a and 6b. Modification of circuits 9241 or 9241' for taking into account permanently the value of angle $\alpha_m$ is within the scope of a man skilled in the art.

Similarly, and this is true even when the system is installed on the ground, the mast is still likely to be deformed which, considering the accuracy required in the measurement of the elevation angles and their difference, may be the cause of errors in determining distance D.

For this, the flexion of the mast is measured for evaluating the angular deviations between the two platforms 2a and 2b and consequently correcting the angular coordinates and particularly the elevation angles.

Figure 12:
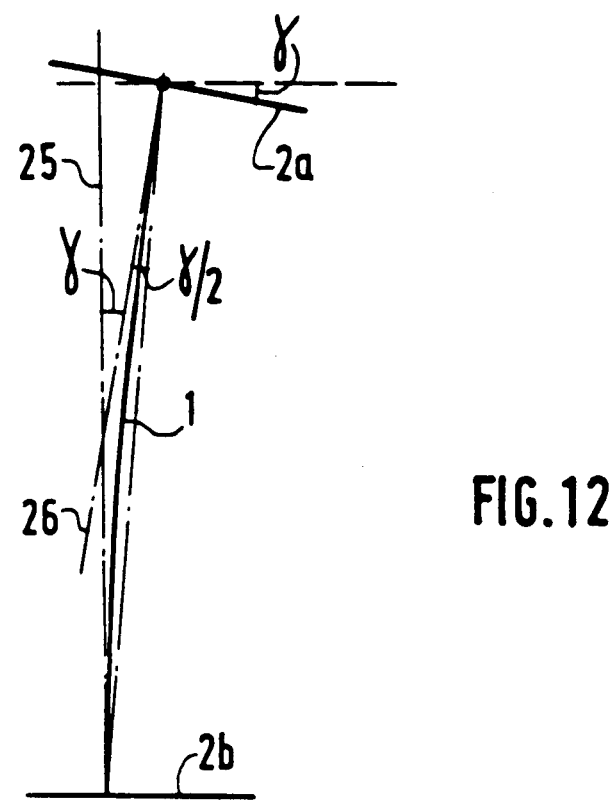
FIG. 12 shows schematically the flexed mast and the platforms of the system of FIG. 1 or of the system of FIG. 10.

FIG. 12 shows for example the case of a mast 1 whose flexion is proportional to the square of the length and for which the angle by which the elevation angle of the upper platform 2a must be corrected is referenced $\gamma$, the lower platform 2b being assumed strictly horizontal. If a laser is disposed on platform 2b, which has only been shown by the beam 25 perpendicular to this platform 2b for the sake of simplicity and if a system is disposed on platform 2a of which only the axis 26 perpendicular to this platform 2a has been shown, for measuring the value of the angle between beam 25 and axis 26, the angle $\gamma$ is measured directly. It is also possible, if the laser is replaced by an omnidirectional source, to measure the angle between axis 26 and the segment which joins the two platforms, which is here equal to $\gamma/2$, taking into account the law of flexion of the mast. It would also be possible to use a set of stress gauges for measuring the flexion of the mast.

Naturally, the angle $\gamma$ must be determined in two perpendicular directions. It is within the scope of a man skilled in the art to provide a circuit for correcting the value of the angles at the output of the extraction circuit 91 so as to accommodate the flexion thus measured.

In the above description, control of the elevational orientation of devices 6a and 6b which have been implicitly assumed fixed has not been mentioned for the sake of simplicity. In practice, devices 6a and 6b are orientable in elevation by means of motors and are provided with angular coders for determining the elevation angle of the mean positions of sighting lines 7a and 7b. Circuit 90 is adapted here for controlling these motors so that the mean positions remain always parallel and the elevation angles measured are fed to circuit 91 which thus determines the absolute value of angles $\alpha$ and $\beta$.

Similarly, for the sake of simplicity, the circuits for associating, two by two, the alarms detected by devices 6a and 6b have not been mentioned in circuit 92 and neither, in circuit 94', the assignment circuits, from one revolution to the next, for associating the values of Y belonging to the same target. Such circuits are of course within the scope of a man skilled in the art.

Naturally, the scope of the present application is not limited to the above description of the system of the invention which has just been given by way of example.

Thus, in particular, the sighting devices 6a and 6b may comprise mosaics of elementary detectors of a form other than that of simple strips, comprising particularly rectangular elements disposed in a staggered arrangement. In addition, it should be noted that the alarm extraction circuit 91 which has been described may be replaced by any image processing device extracting the most intense sources therefrom.

Similarly, it is useful to use the intensity of the radiation received coming from a source rather as one of the angular coordinates of this source, but this is not obligatory and it is in particular possible, for simplifying the system, to use only bearing and elevational two dimensional windows, even elevational monodimensional windows.

Similarly, the system of the invention is not limited to the infrared range and may be used whatever the radiation emitted naturally by the target and which serves for detecting it.

Finally, for clarity of the description, each of the main functions has been shown in the form of a block or particular circuit. In practice, some of these functions, and particularly the computing functions, may be accomplished by the same circuit, in particular a microprocessor.

What is claimed is:

1. A system for determining the position of at least one target emitting radiation, comprising:
    two passive sighting devices, sensitive to said radiation, disposed at a distance from each other and movable in rotation about a substantially vertical common axis,
    means for measuring the intensity of the radiation received by one of the sighting devices along a sighting line scanning a substantially vertical sighting plane, common to the two sighting devices,
    means for extracting, in response to the intensities measured, the values of the elevation angles of said target relatively to the two sighting devices, and
    means for computing, in response to the values of the elevation angles, the distance of said target by triangulation in said substantially vertical common sighting plane, wherein
    each of the two sighting devices comprises its own means for measuring the intensity of the radiation received, its own drive means for driving it in rotation about said common axis and its own means for measuring its bearing angle, and
    means are provided for controlling said means driving it in rotation about said common axis, in response to the values of the bearing angles measured, and arranged so that said bearing angles are equal.

2. The system as claimed in claim 1, wherein means are provided for determining, in response to the values at the output of said extraction means of the bearing angle and of the elevation angle relative to one of the sighting devices, first ranges of possible values for the bearing angle and the elevation angle relative to the other sighting device and first means for comparing, with the first ranges of possible values, the values at the output of said extraction means of the bearing angle and of the elevation angle relative to the other sighting device and inhibiting said means computing the distance of said target when these values at the output of said extraction means are not included in the first ranges of possible values.

3. The system as claimed in claim 2, wherein said extraction means also determine the values of the intensities received by each of the sighting devices from said target, said means for determining the first ranges of possible values also determine, in response to the value at the output of said extraction means of the intensity received by one of the sighting devices, a first range of possible values for the intensity received by the other sighting device and the first comparison means also compare the value at the output of said extraction means of the intensity received by the other sighting device with the first corresponding range of possible values.

4. The system as claimed in claim 1, wherein each of said sighting devices comprises a mosaic of elementary detectors, said measured intensities are those of pixels of an image of the zone analyzed by each of the sighting devices, and said extraction means comprise means for determining the coordinates of the image pixel of the target and means for determining the angular coordinates of the target by extrapolation.

5. The system as claimed in claim 4, wherein said means for determining the angular coordinates of the target by extrapolation also determine by extrapolation the intensity received from the target.

6. The system as claimed in claim 1, wherein said means for computing the distance of the target comprise means for computing the tangents of said elevation angles, means for computing the difference of said tangents, means for the predictive filtering of said difference over several revolutions of rotation about said common axis, and means for computing the distance of said target in response to said tangents and said filtered difference.

7. The system as claimed in claim 2, wherein tracking means are provided for determining, in response to the angular coordinates of the target determined during a revolution of rank n, second ranges of possible values for the angular coordinates of the target during the revolution of rank (n+1), and second means for comparing, with the second ranges of possible values, the values determined during the revolution of rank (n+1) and reducing, in response to the distance measured during the revolution of rank n, said first range of possible elevation angle values, when the values determined during the revolution of rank (n+1) are included in said second ranges of possible values.

8. The system as claimed in claim 7, wherein said tracking means determine, in response to the intensity received from the target during the revolution of rank n, a second range of possible values for the intensity received from the target during the revolution of rank (n+1), and the second comparison means also compare the value of the intensity received during the revolution of rank (n+1) with the second corresponding range.

9. The system as claimed in claim 1, in which the sighting devices are mounted on a mast liable to flex and comprising means for measuring the flexion of the mast and correcting the values of said bearing and elevation angles at the output of said extraction means.

10. The system as claimed in claim 1, installed on board a ship, and comprising means for measuring the slant of the platforms with respect to the horizontal and correcting the values of said bearing and elevation angles at the output of said extraction means.

* * * * *